United States Patent [19]

Ferrante

[11] Patent Number: 5,576,886
[45] Date of Patent: Nov. 19, 1996

[54] HUD WITH A SPECTRAL CONTOUR DIELECTRIC COMBINER

[75] Inventor: Ronald A. Ferrante, St. Charles, Mo.

[73] Assignee: McDonnell Douglas Corp., St. Louis, Mo.

[21] Appl. No.: 287,613

[22] Filed: Aug. 8, 1994

[51] Int. Cl.$^6$ ........................................... G02B 27/14
[52] U.S. Cl. .......................... 359/630; 359/629; 359/634
[58] Field of Search .................................. 359/629, 630, 359/631, 634, 639

[56] References Cited

U.S. PATENT DOCUMENTS

| | | | |
|---|---|---|---|
| 3,778,548 | 12/1973 | Nistri | 359/634 |
| 4,652,870 | 3/1987 | Steward | 340/705 |
| 4,655,540 | 4/1987 | Wood | 359/13 |
| 4,669,810 | 6/1987 | Wood | 359/13 |
| 4,763,990 | 8/1988 | Wood | 359/634 |
| 4,775,218 | 10/1988 | Wood | 359/630 |
| 4,799,765 | 1/1989 | Ferrer | 359/631 |
| 4,832,449 | 5/1989 | Mundy | 359/634 |
| 5,194,989 | 3/1993 | Ferrante | 359/583 |
| 5,249,081 | 9/1993 | Rogers | 359/633 |
| 5,299,063 | 3/1994 | Fritz | 359/631 |

*Primary Examiner*—Georgia Y. Epps
*Assistant Examiner*—Ricky Mack
*Attorney, Agent, or Firm*—Pillsbury Madison & Sutro LLP

[57] ABSTRACT

An aircraft head-up display with a combiner using a thin film dielectric reflector with a contoured reflectance spectrum of a narrow bandwidth that matches the spectrum of the light output of a cathode-ray tube whose phosphors produce a narrow bandwidth light output used to create visual data for display to the pilot. The dielectric combiner is constructed with a dielectric coating made up of ion deposited layers, with alternate layers having different indices of refraction and possibly different thicknesses near one quarter wavelength thick. The resultant combiner transmits ambient light essentially without attenuation at all visible light frequencies except those frequencies of the visual data produced by the CRT phosphors, which are reflected into superposition with the background viewable through the combiner.

21 Claims, 9 Drawing Sheets

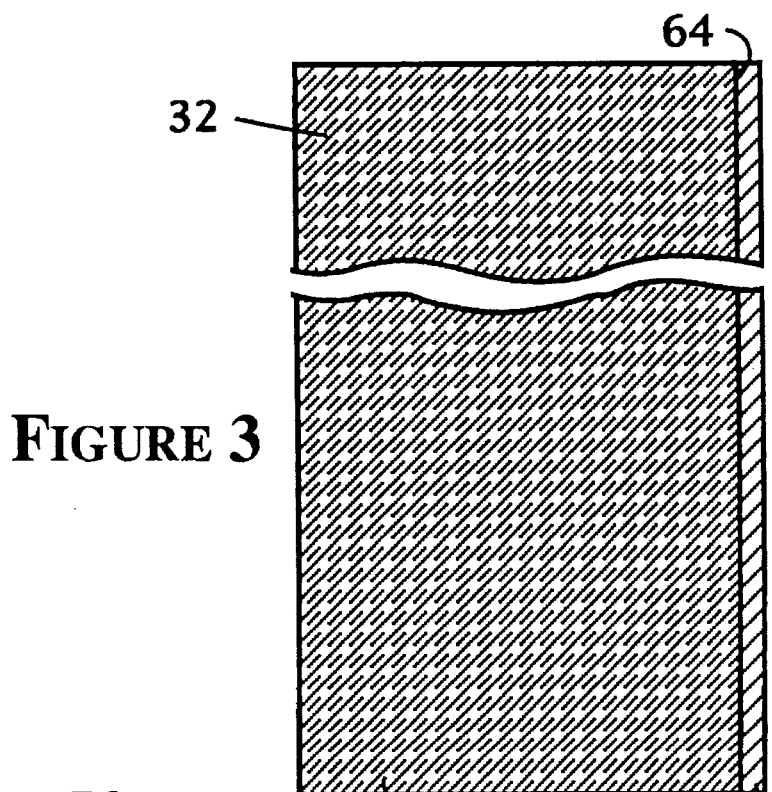
FIGURE 3
FIGURE 5
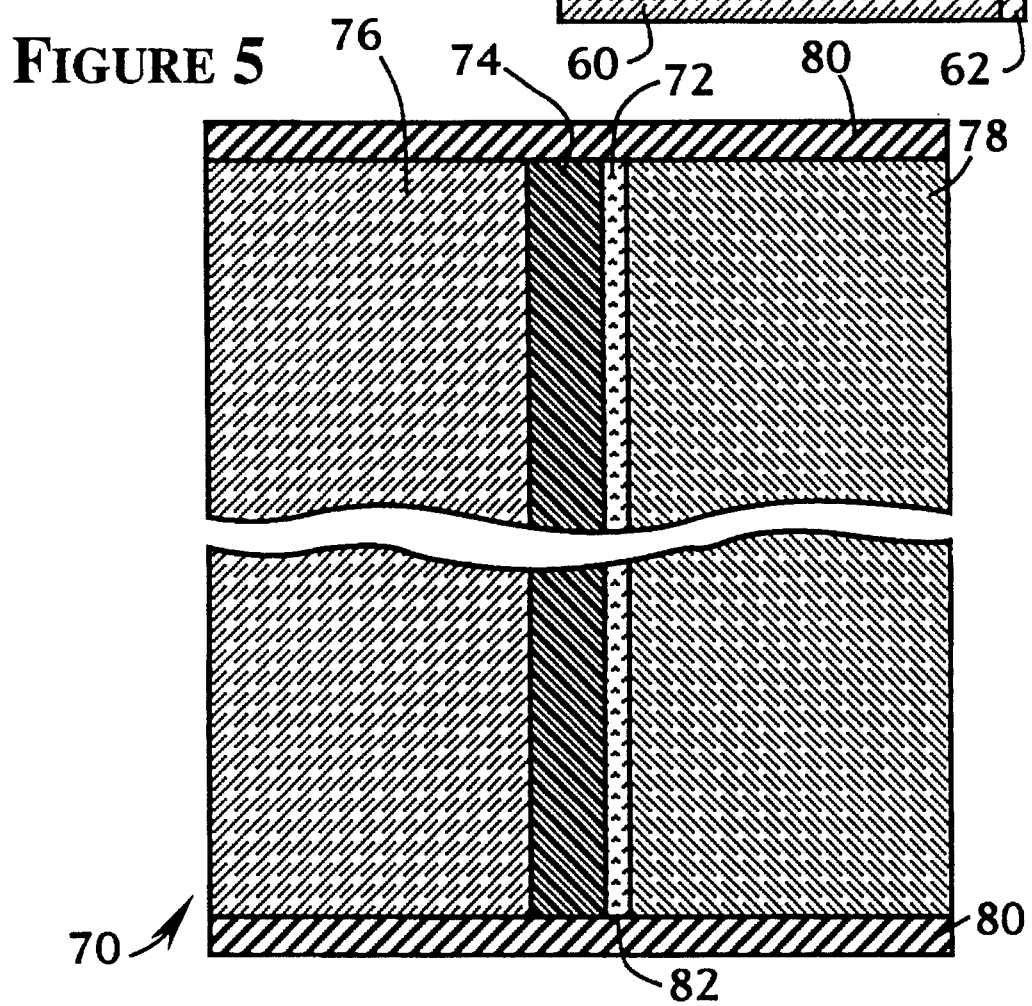

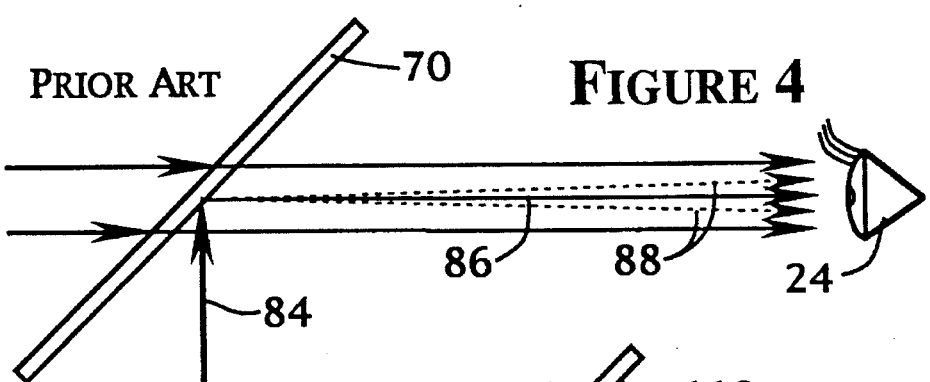
PRIOR ART FIGURE 4
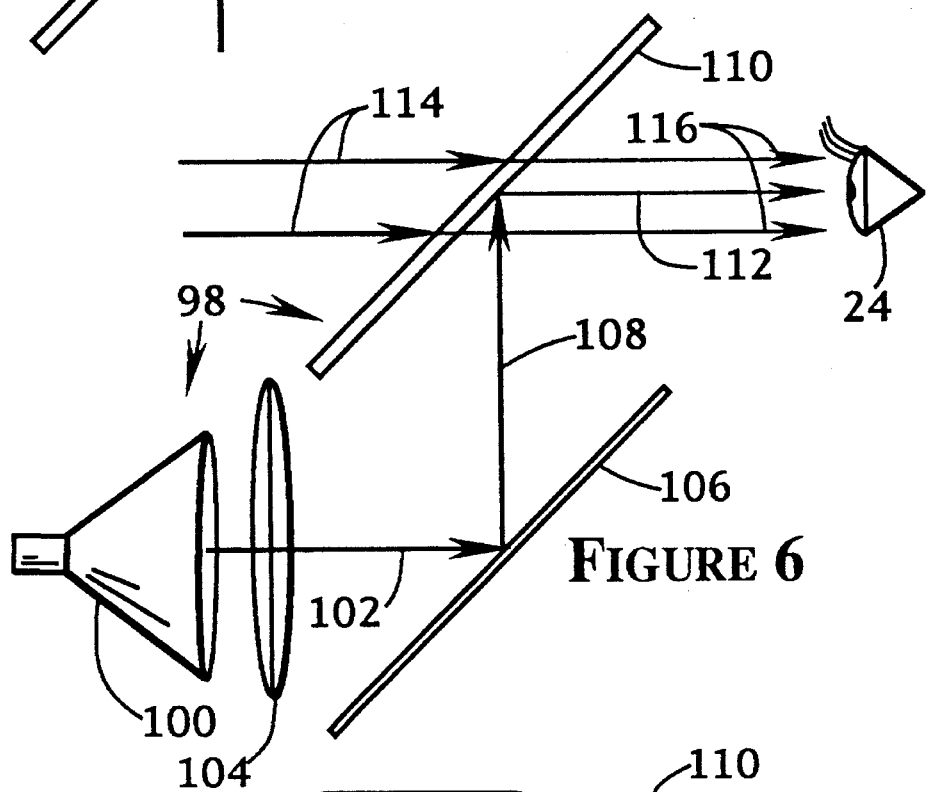
FIGURE 6
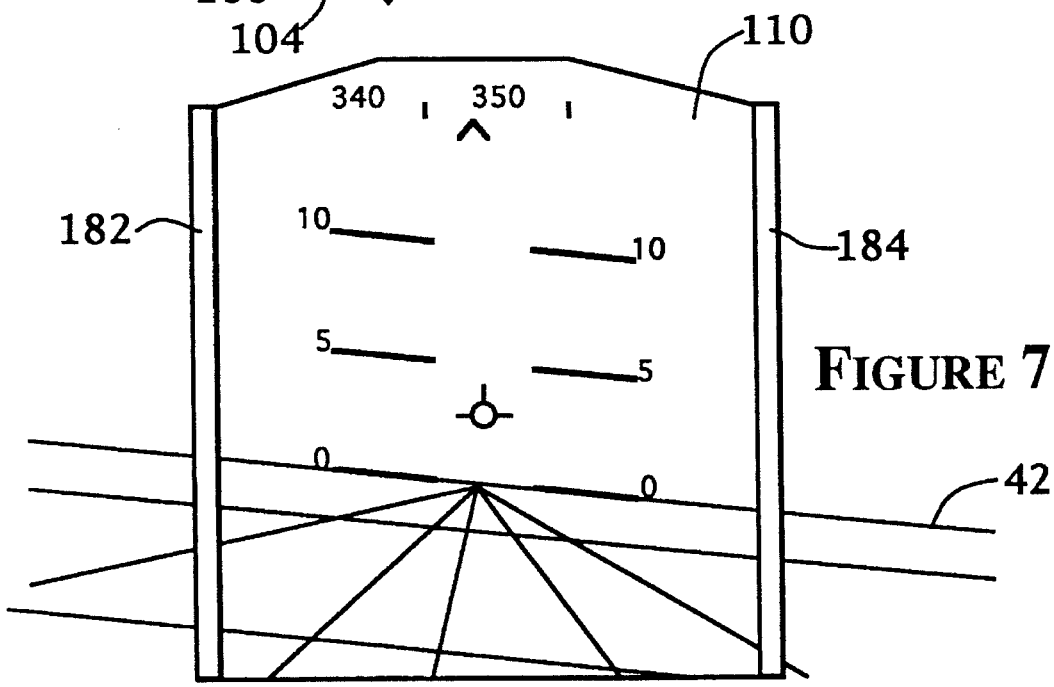
FIGURE 7

HUD WITH A SPECTRAL CONTOUR DIELECTRIC COMBINER

BACKGROUND OF THE INVENTION

The head-up display (HUD) performs one of the most critical and complex functions of any avionics system in modern combat aircraft, as well as in other state-of-the-art aircraft. Display of visual data on the HUD allows the pilot to control the aircraft, navigate, target and perform other key tasks during an engagement without removing or refocussing his eyes from the frontal view of the aircraft. In a HUD, pilot information is projected from a cathode ray tube (CRT) through relay optics onto a transparent reflector, normally referred to as a combiner glass, positioned between the pilot and the windscreen of the aircraft.

Originally, combiners were broadband partially mirrored glass, because such broadband reflectors are easily implemented reflectors of CRT light. Unfortunately, when they are sufficiently mirrored to reflect a sufficient amount of CRT produced light for high ambient light conditions, they also attenuate light from the outside world that should be transmitted therethrough to an unacceptable degree.

The current performance requirements of HUD combiners for combat aircraft include: high photopic transparency and high reflectance efficiency at the wavelengths of the phosphors of the CRT. Heretofore, such requirements have dictated the use of dichromated gelatin holographic thin films as the active combiner material.

Dichromated gelatin holographic thin films are difficult to fabricate, requiring large capital investments and long learning times for manufacturing personnel as the process is as much art as science. Therefore, there are only a few suppliers of such dichromated gelatin combiners in the entire world, and those that can produce them, do so at a very high cost. Such hologram fabrication is inherently a sequential "one step at a time" process. The resultant gelatin thin films are very fragile and highly susceptible to mechanical abrasion and moisture damage so dichromated gelatin combiners must be protected by heavy, cemented cover glass on the opposite sides thereof and a circumferential seal. These difficulties make holographic combiners extremely costly, and subject to long lead times and occasional unavailability. In addition, optical noise recorded during the holographic recording process produces flare or rainbow patterns around point sources viewed through the combiner, reducing visual acuity.

Because of the inefficiencies of available combiners, CRTs must be run at extremely high intensity levels in locations where little space is available for cooling. The result is the CRTs must be replaced after as little as 100 hours of daylight operation. The CRT usually must be mounted forward of the instrument panel in a crowded nose area under the windscreen. Therefore, CRT replacement is very time consuming, resulting in unavailability the aircraft for a substantial length of time while its HUD CRT being is replaced and contributing in a major way to the number of maintenance hours required for every hour flown.

Holographic combiners have high visibility through the elements but are inefficient CRT phosphor reflectors due to their limited angular bandwidth. Optical power can be added to increase angular bandwidth, but only at higher and higher optical noise levels. Superposition of two or more holograms can be used to roughly approximate phosphor spectral output, but such approaches also have limited flexibility, much higher cost, and increased combiner noise.

Therefore, there has been a need to improve optical performance of aircraft head-up display combiners while simultaneously reducing cost and weight.

SUMMARY OF THE INVENTION

In the present invention, narrow bandwidth, commercially available high output CRT's are combined with tailored, thin film dielectric reflectors designed with narrow contoured spectral bandwidths and maximum reflectance greater or equal to CRT phosphor bandwidths and desired peak reflectance, respectively. Commercially available, thin optical film computer design codes with optimization routines are available with which dielectric coatings can be tailored. A suitable software package is FILMSHOW by FTG Software Associates, Princeton, N.J.

To produce an optimal design, the fundamental design trade-off of angular bandwidth versus spectral bandwidth/photopic transmittance must be examined. Assuming the use of a P-53 CRT, which is as bright and narrow banded as any other CRT commercially available, in order to achieve high phosphor reflectance efficiency, a minimal spectrum bandwidth of 25 nanometers (nm) is required so that fabrication tolerances and angular shift effects, as viewing position moves within the pilot eye-box, can be accommodated. In order to minimize angle shift while maximizing photopic transmittance through the combiner, high refractive index materials must be employed.

A known limitation of conventional evaporative coating technology is the tendency of such coatings to absorb water under high humidity conditions. This water absorption is caused by the columnar micro-structure of such films. The absorption of water results in refractive index variations that can shift spectral peak response by 35 nanometers or more. This is clearly unacceptable for a dielectric combiner whose reflectance bandwidth may be as small as 25 nm. Fortunately, two environmentally stable coating methods for producing dielectric films are available, reactive ion plating (RIE) and ion assisted deposition (IAD). Both are vacuum deposition methods that produce dense, hard dielectric thin films without columnar micro-structures and can be produced by similar ion beam technology. Both Optical Coating Laboratory, Inc. of Santa Rosa, Calif. and Omitec Thin Films Ltd., of Totnes, England are examples of facilities where dielectric thin films made using IAD techniques and tailored as demanded by performance requirements, can be applied to a combiner glass. Both processes are also desirable because they enable multiple identical combiners to be produced within a vacuum chamber at the same time.

Therefore, it is an object of the present invention to provide improved HUDs and HUD combiners.

Another object is to provide a HUD combiner that is highly transmissive of light from the outside world, does not produce flare or rainbows about objects displayed thereon, and yet, can very efficiently reflect CRT produced visual data to a pilot over a wide angular view.

Another object is to reduce the cost and weight of HUD combiners.

Another object is to provide a HUD combiner so efficient that CRTs in HUD systems can be driven at less than maximum levels, resulting in long lifetimes for the CRTs.

Another object is to provide a HUD combiner whose reflective characteristics can be matched during manufacture to narrow band CRTs having different spectral shapes at different frequencies.

Another object is to provide a HUD combiner whose characteristics can be adjusted during manufacture to correspond to a predetermined mission.

Another object is to provide a substitutable HUD combiner whose characteristics can be matched to the ambient light conditions in which it is expected to operate during the next flight.

These and other objects and advantages of the present invention will become apparent to those skilled in the art after considering the following detailed specification together with the accompanying drawings wherein:

BRIEF DESCRIPTION OF THE DRAWINGS

FIG. 3 is an enlarged cross-sectional view of the combiner of FIGS. 1 and 2;

FIG. 4 is side-view, similar to FIG. 1, of a HUD having a dichromated gelatin, holographic thin film combiner constructed in accordance with the prior art;

FIG. 5 is an enlarged cross-sectional view of the combiner of FIG. 4;

FIG. 6 is side-view, similar to FIGS. 1 and 4, of a HUD having a contoured spectrum, dielectric thin film combiner constructed in accordance with the present invention;

FIG. 7 is a view similar to FIG. 2 through the combiner of FIG. 6;

DETAIL DESCRIPTION OF THE INVENTION

Figure 1:
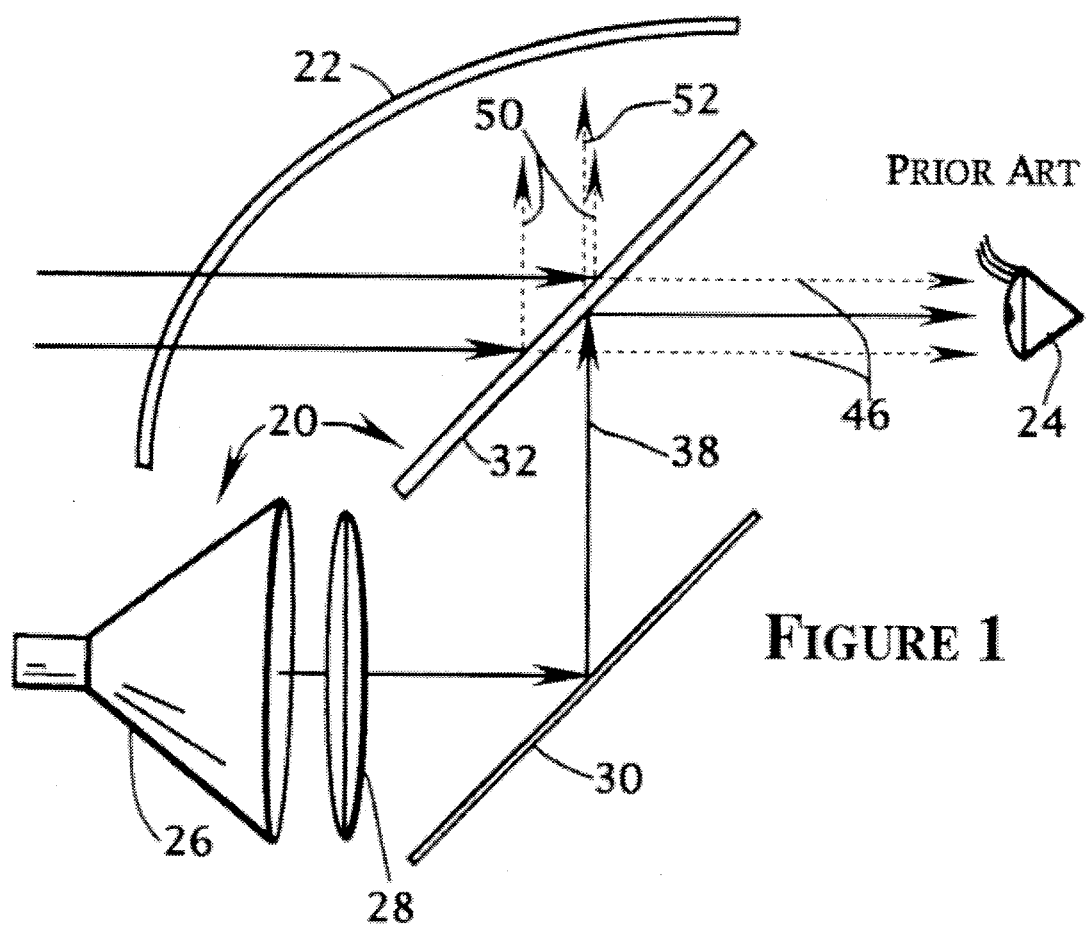
FIG. 1 is a simplified diagrammatic side view of a HUD having a metallic combiner constructed in accordance with the prior art.

Referring to the drawings, more particularly by reference numbers, number 20 in FIG. 1 refers to a prior art HUD system installed under an aircraft windscreen 22 shown with respect to the normal viewing eye 24 position of a pilot. Generally, the optical portions of a HUD system 20 include a CRT 26, focussing optics 28, a beam folding mirror 30 and a combiner 32. Although the combiner 32 is shown as a flat plate, modern combiners normally have a slight curvature (~650 centimeters radius) to correct for the different viewing angles and to increase the field of view.

Figure 2:
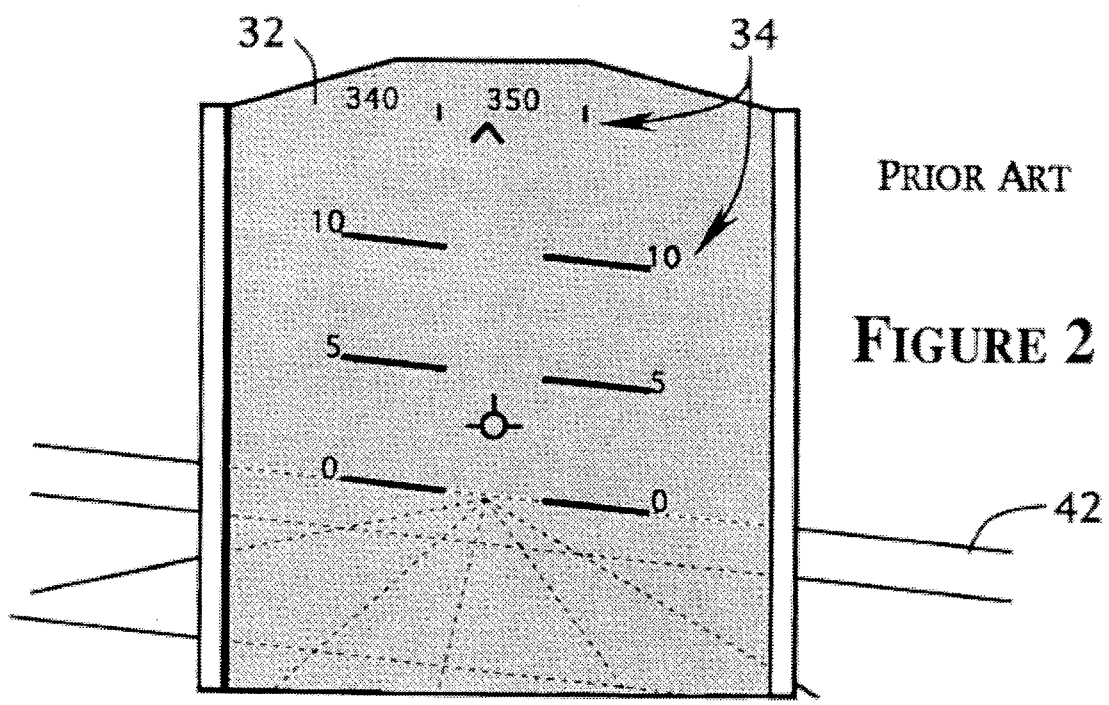
FIG. 2 is a simplified, through the HUD view of the outside world with the prior art combiner of FIG. 1.

The combiner 32 is used to superimpose visual data in the form of an image 34 (FIG. 2) generated by the CRT 26, whose path to the pilot's eye 24 is shown generally by arrows 36, 38 and 40. The view of the outside world 42 is transmitted through the combiner 32 (shown by arrows 44 and 46) so that the image 34 is superimposed thereon to provide useful clues to the pilot as to his aircraft's condition with respect to the outside world 42. The examples of visual data being shown in FIG. 2 are aircraft attitude and direction, although such visual data is usually much more complex. As can be seen on the HUD combiner 32, the aircraft is approximately 3° nose-up from the horizon, is in a slight left bank, and is pointing at a compass heading of 348°. In the dynamic situation shown, the compass heading most likely would be moving westward.

The combiner 32 must reflect the light 38 to the pilot's eye 24 while at the same time transmitting the light 44 representative of the view of the outside world 42, shown as light beams 46 to the pilot's eye 24. When the combiner 32 is partially metalized to produce the desired reflection of the beam 38, substantial attenuation of the light 44 occurs, usually by being reflected in some undesirable direction shown by arrows 50. Also, some of the light 38 is not reflected and it also escapes, as shown by arrow 52. An ideal combiner 32 would maximize its transmission of all the light 44 for operation during low light conditions and yet reflect all of the light 38 for operation during high ambient light conditions.

As shown in FIG. 2, the result of compromise of the two seemingly opposite requirements can be a disconcerting change in background light intensity that tends to obscure the view of the real world 42 though the combiner 32.

FIG. 3 is a greatly enlarged cross-sectional view of the combiner 32 showing a glass substrate 60 with a metallic reflective coating 62 applied to one surface 64 thereof. Such coatings 62 are extremely thin, their thickness controlling the ratio between the transmissive and reflective characteristics of the combiner 32. A similar HUD 68 with a holographic combiner 70 is shown in FIG. 4. A greatly enlarged cross-section of the holographic combiner 70 is shown in FIG. 5. Combiner 70 includes at least one gelatin thin film 72 with a hologram captured therein to provide the reflective element of the combiner 70. Such gelatin thin films 72 are very difficult to fabricate. The gelatin thin film 72 is formed on an epoxy layer 74. The epoxy layer 74 and the gelatin thin film 72 are sandwiched between two sheets of thick protective glass 76 and 78. The current price of such combiners 70 is about $100,000 apiece and they are very susceptible to destruction due to high humidity or temperature. The humidity problem is counteracted by providing a seal 80 about the periphery 82 of the gelatin layer 72. However, the effectiveness of the seal 80 is difficult to maintain in the harsh environments in which the combiner 70 is likely to be subjected. In addition, if the temperature of the combiner 70 exceeds 190°, a temperature that easily can be reached underneath a closed canopy in an equatorial daylight desert environment, the hologram within the gelatin 72 disappears and the combiner 70 is ruined.

Effective combiners 32 or 72 have proved very difficult to design and manufacture. State-of-the-art of CRTs 26, small enough to fit in the confined volume available in modern combat aircraft and the losses associated in the focussing optics 28 required to fool the eye 24 into believing that the projected visual image is at the same focus as the outside world, result in the light shown by arrow 38 being only at the lower edge of the intensity desired for operation during bright sunlight. For this reason, the CRTs 26 are driven as hard as possible causing undesirably short CRT lifetimes.

The combiner 70, although much more transmissive than the combiner 32, has operational problems as well in that acceptable sight angles are very narrow before the CRT image 84, as reflected image 86, begins to lose light intensity. Also, the image 86 as seen by the eye 24, often has rainbows or flares shown by arrows 88 that degrade its presentation to the viewer, especially if a pilot's eyes 24 are higher or lower than the design elevation.

A HUD system 98 constructed according to the present invention, is shown in FIG. 6. The system 98 includes a CRT 100, such as the P-53 CRT, chosen for its narrow spectral characteristics. Like in system 20, the output 102 of the CRT 100 passes through suitable focussing optics 104, and is reflected off a folding mirror 106 as beam 108. The beam 108 is directed onto a spectrally contoured dielectric combiner 110. The combiner 110 reflects the image produced by the CRT 100 toward the eye 24 as beam 112 in combination with the view of the outside world 42 (beams 114) that is transmitted through the combiner 110 with very little degradation as beams 116, resulting in the visual characteristics shown in FIG. 7.

Figure 8A:
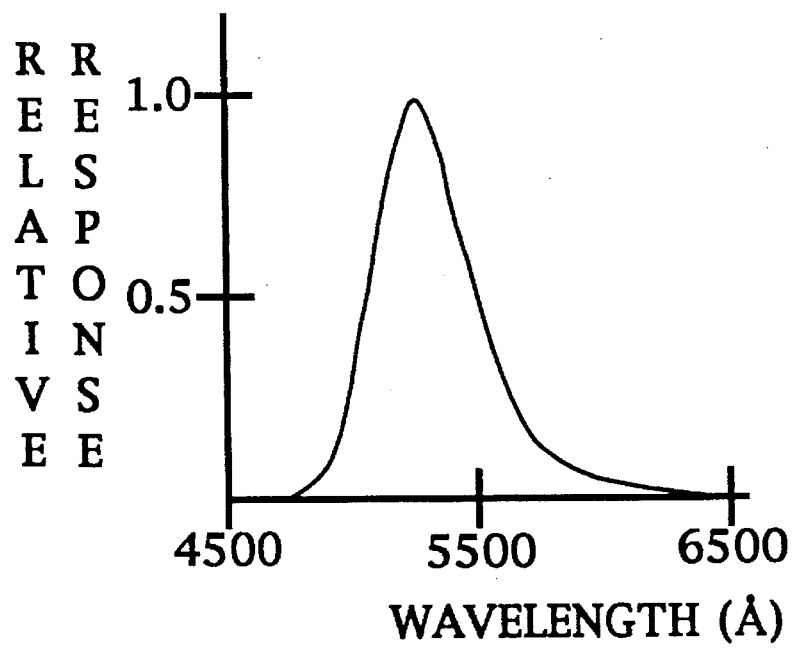
FIG. 8A is a graph of response to wavelength in angstroms of conventional broadband CRT phosphors.
Figure 8B:
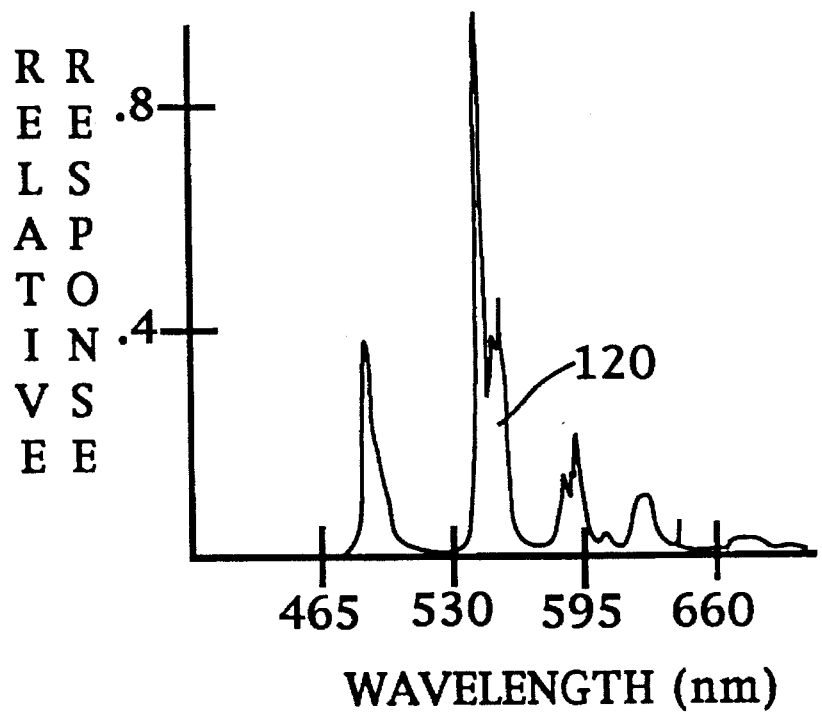
FIG. 8B is a graph of response to wavelength in angstroms of P-53 CRT phosphors.
Figure 8C:
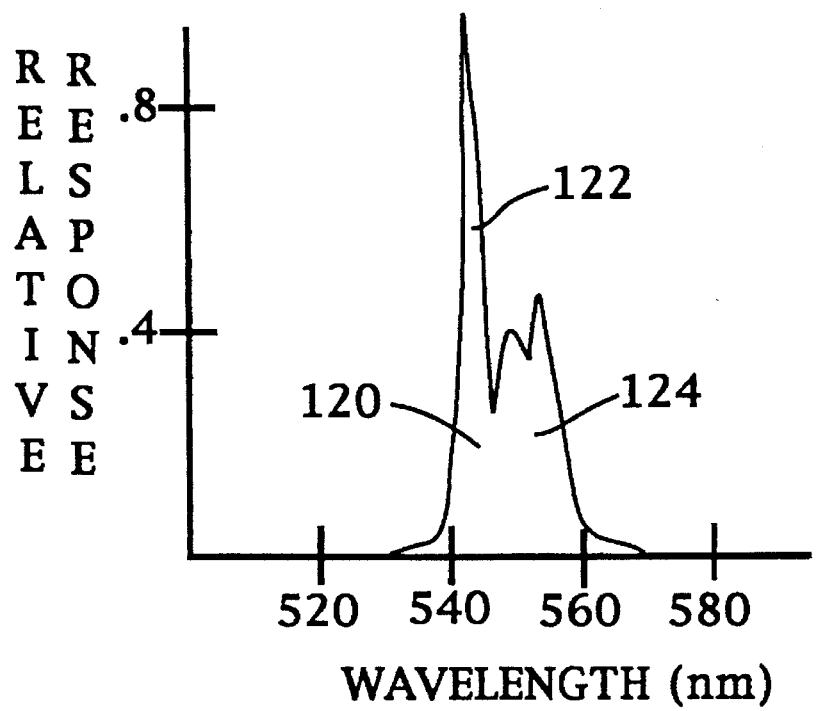
FIG. 8C is an enlargement of the main lobe of the graph of FIG. 8B wherein most of the light energy of the P-53 CRT phosphors is produced.
Figure 9:
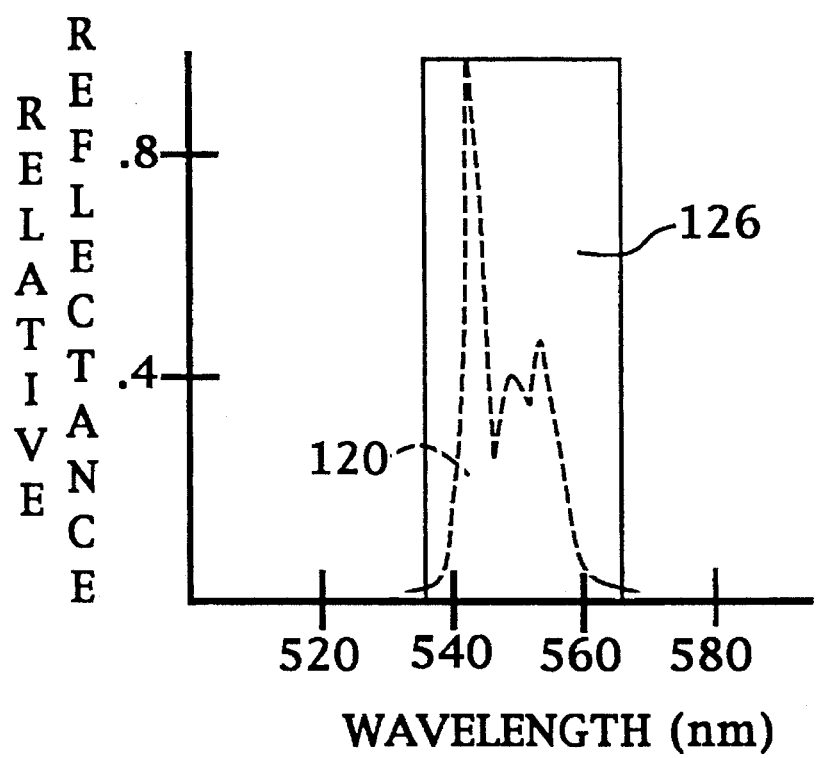
FIG. 9 is a graph of reflectance versus wavelength in nm for a combiner maximized to reflect the P-53 CRT output (shown in dashed line) for an aircraft that is operated in high ambient light environments.
Figure 10:
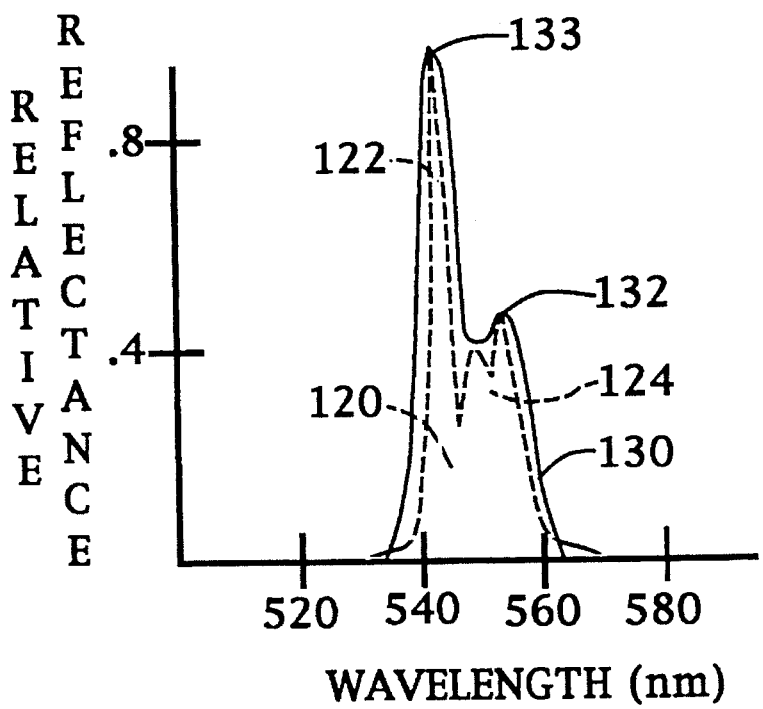
FIG. 10 is a graph of reflectance versus wavelength in nm for a combiner matched to the P-53 CRT output (shown in dashed line) to maximize transmittance as is needed for an aircraft that is operated both at night and in high ambient light environments.
Figure 11:
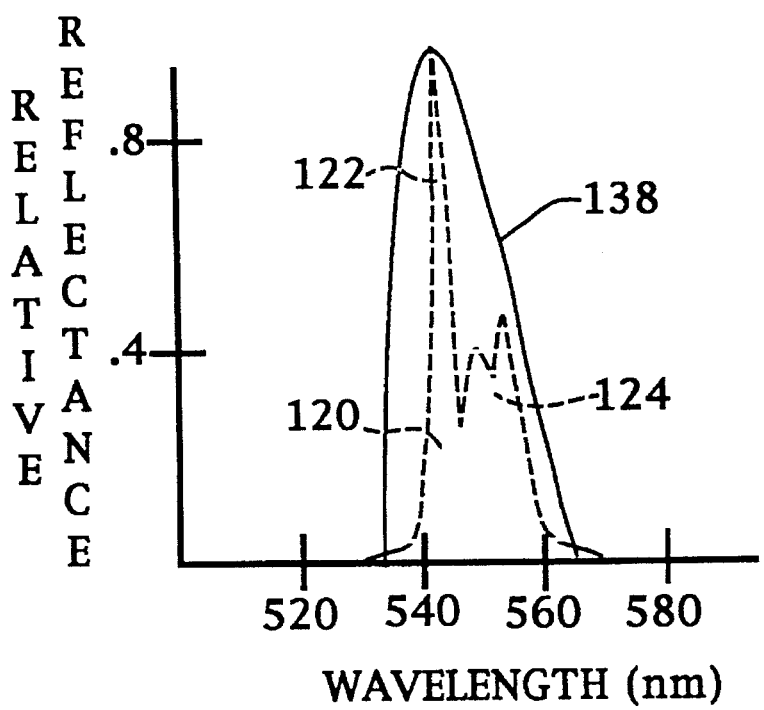
FIG. 11 is a graph of reflectance versus wavelength in nm for a more economical combiner where the reflectance is roughly matched to the P-53 CRT output (shown in dashed line) to provide suitable reflectance and transmittance for all but the most demanding missions.

Normal wide band CRT output is shown in FIG. 8A. Narrow band spectral output 120 of the CRT 100 is shown in the graphs of FIGS. 8B and 8C. Note (FIG. 8C) that the spectral output has two major wavelength bands 122 and 124, wherein most of the light energy is resident. For optimum reflectivity of the spectrum 120, the combiner 110 could be constructed to reflect the spectrum 126 shown in FIG. 9, which generally is a square notch 35 nm wide, enclosing the entire bandwidth where energy is present in the spectrum 120, and providing some extra bandwidth for differences in elevation of the pilot's eyes 24. However, such would result in a decided color tint to the combiner 110 since light at those bandwidths from the real world 42 would effectively be blocked. The reflective notch 130 about 25 nm wide shown in FIG. 10, having lobes 132 and 133 that almost exactly match the humps 122 and 124 of the spectrum 120 results in maximum utilization of the beam 108 and the highest intensity beam 112 that can be reflected to the eye 24 with minimal degradation of the transmissivity of the combiner 110. However, to get such a notch 130, requires many more processing steps in the fabrication of the combiner 110 and results in a reduction in reflection as soon as the pilot's eyes 24 move from the design elevation. Therefore, as shown in FIG. 10, a compromise notch 138, having a single lobe about 30 nm wide that encompasses most of the 25 nm wide spectrum 120 is preferred, since it can meet all but the most demanding customer's requirements at minimal cost. Note that the notch 130 can be wider to accommodate larger than normal variations in elevation of the pilot's eyes 24.

Figure 12:
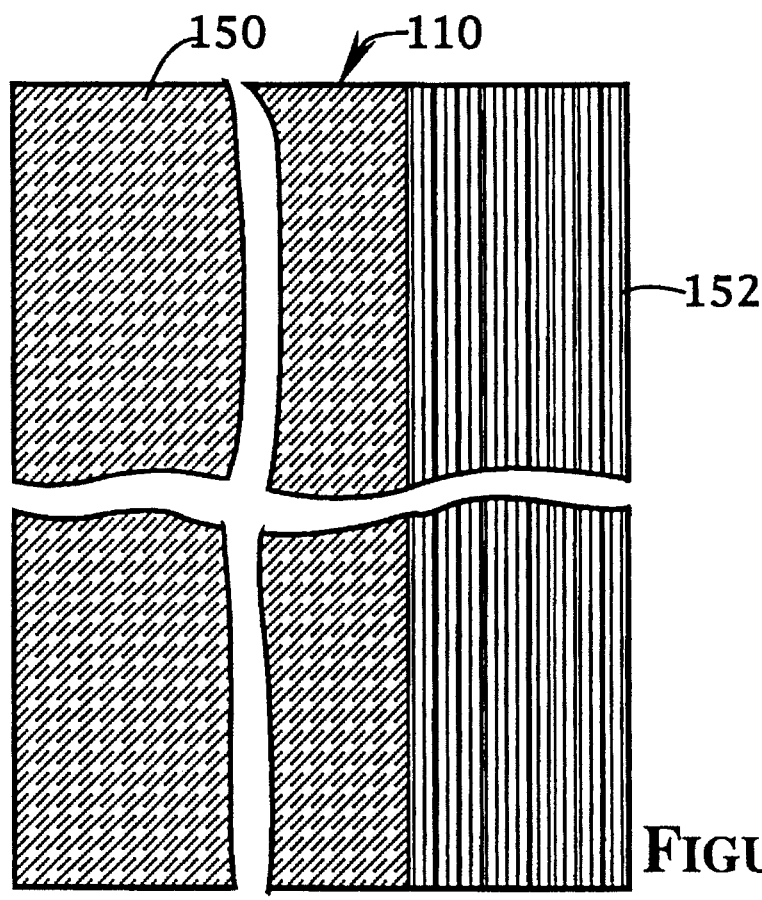
FIG. 12 is an enlarged cross-sectional view of the combiner of FIGS. 6 and 7.
Figure 13:
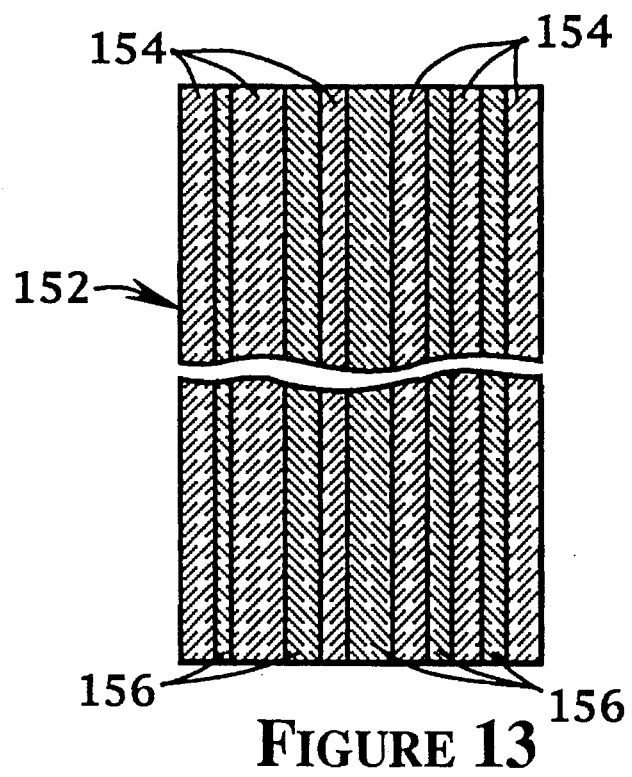
FIG. 13 is a greatly enlarged cross-sectional view of the dielectric thin films of the combiner of as shown in FIGS. 6 and 7.

FIG. 12 is an enlarged, detailed cross-sectional view of the combiner 110 showing its glass substrate 150 and stack 152 of dielectric layers applied by ion assisted deposition. The stack 152 of dielectric layers that are ion assisted implanted include about quarterwave thickness alternate layers 154 and 156 having high and low refractive indices respectively. The aforementioned computer program, FILM-SHOW, is a useful tool to determine the number of layers 154 and 156 required and their exact thicknesses to acquire a stack 152 with the desired reflective and transmissive characteristics.

Figure 14:
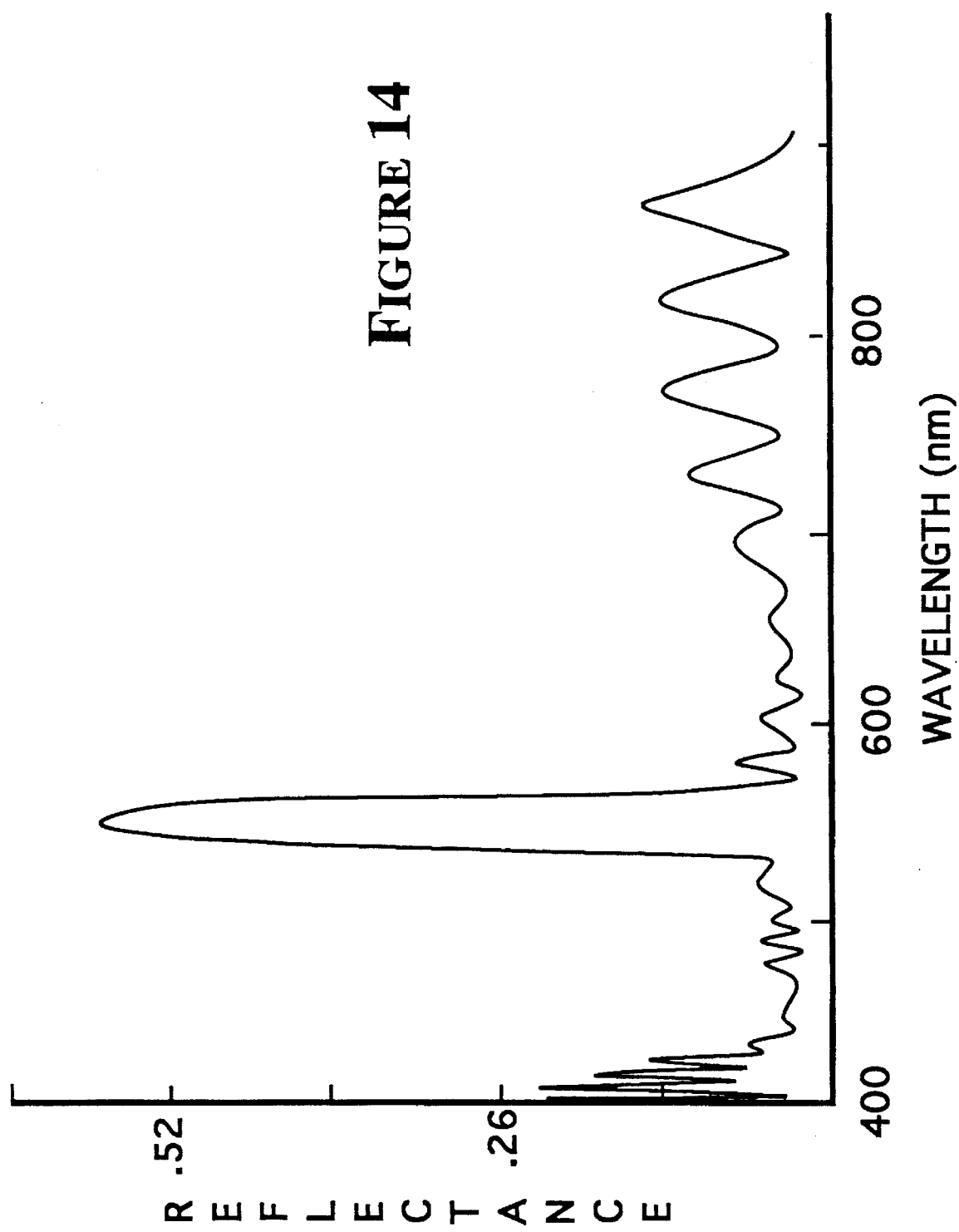
FIG. 14 is a graph of reflectance versus wideband wavelength in nm of an actual combiner constructed in accordance with FIGS. 12 and 13.
Figure 15:
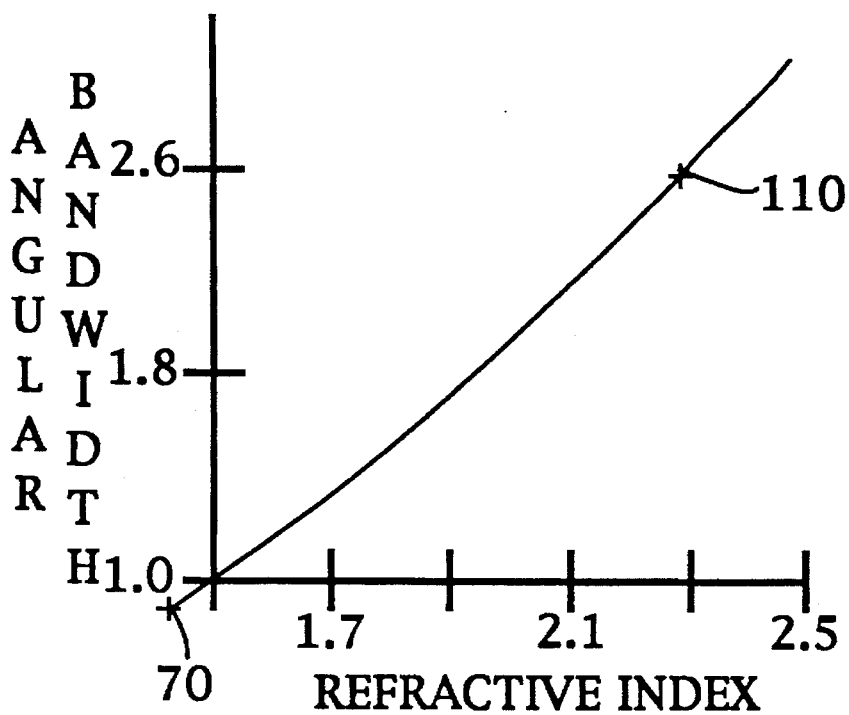
FIG. 15 is a graph of angular bandwidth versus refractive index.
Figure 16:
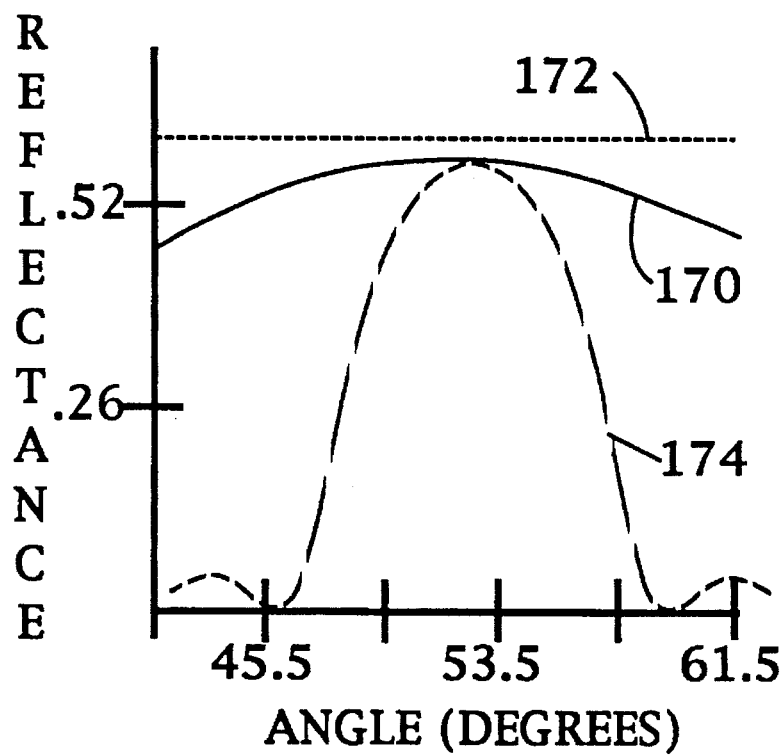
FIG. 16 is a graph of reflectance index versus angle for ideal, thin film dielectric, and holographic combiners.

The result is a environmentally rugged combiner 110 that produces no flares or rainbows, that is at least an order of magnitude cheaper to make than the holographic combiner 70, and whose transmissive and reflective characteristics are at least as good. The total reflectance of such a combiner 110 over a wide band is shown in FIG. 14. As shown by FIGS. 15 and 16, the combiner 110 has much higher angular bandwidth and refractive index than that of holographic combiners 70, and a very small fall off in reflectance with angle shown by curve 170 with respect to an ideal characteristic 172 and the characteristic 174 of available holographic combiners 70.

The resultant combiner 110 is extremely rugged and not subject to failure due to exposure to humidity or high heat conditions. It is so rugged that it can be provided in removable frames [180 and 182] (FIG. 7) with its characteristics optimized for particular missions. For example, reflectivity is not as critical for night missions with low ambient light levels but transmissivity of the outside world is. On the other hand, during daytime, equatorial desert conditions, transmissivity of a view of the outside world is not as important as reflectivity. The construction of the contoured spectral dielectric combiner 110, therefore, can be tailored to its intended use, allowing the CRT 100 to be operated at much lower levels wherein its lifetime is extended exponentially.

Therefore, there has been shown and described a novel HUD system with a contour spectral dielectric combiner which fulfills all of the objects and advantages sought therefore. Many changes, alterations, modifications and other uses and applications of the subject HUD systems and components will become apparent to those skilled in the art after considering the specification together with the accompanying drawings. All such changes, alterations and modifications which should not depart from the spirit and scope of the invention are deemed to be covered by the invention, which is limited only by the claims that follow:

I claim:

1. A head-up display system that superimposes visual data on a background scene including:

a CRT for producing visual data as a light output, said CRT having:

an output light spectrum of frequencies with a plurality of peaks of shaped intensity so that most of the light output thereof is at frequencies within said plurality of peaks of shaped intensity; and a combiner having:

a transparent substrate; and a contoured spectrum reflector on said substrate that produces reflectance in a frequency band that includes the frequencies of at least one of said peaks of shaped intensity of said output light spectrum, said contoured spectrum combiner including:

a plurality of first dielectric layers each having:

a refractive index in a first range; and a thickness near the quarter wavelength of a frequency in said CRT output light spectrum; and a plurality of second dielectric layers each having:
  a refractive index in a second range lower than said first range; and
  a thickness near the quarter wavelength of a frequency in said CRT output light spectrum, said contoured spectrum reflector having said second dielectric layers interleaved with said first dielectric layers, said combiner being positioned and angled with respect to the background scene and said light output of said CRT to superimpose visual data at frequencies at at least one of said peaks of shaped intensity on the background scene.

2. The head-up display system as defined in claim 1 wherein said at least one of said peaks of shaped intensity of said output light spectrum of said CRT has:
  a wavelength bandwidth less than 25 nm wide, and wherein said plurality of first and second layers having first and second reflectances of said contoured spectrum reflector produce:
  reflectance over a bandwidth that is not more than 35 nm wide, which includes the frequencies of said at least one peak of shaped intensity.

3. The head-up display system as defined in claim 1 wherein said at least one peak is two peaks within a wavelength bandwidth less than 25 nm wide, and wherein said contoured spectrum reflector produce:
  reflectance over a bandwidth that is not more than 30 nm wide and which includes the wavelengths of said two peaks.

4. The head-up display system as defined in claim 1 wherein at least some of said layers of said pluralities of first and second dielectric layers have different thicknesses.

5. The head-up display system as defined in claim 4 wherein at least one of said plurality of peaks of shaped intensity of said output light spectrum of said CRT has a wavelength bandwidth, and wherein said contoured spectrum reflector produces reflectance over a bandwidth that is less than 30 nm wide and which includes said wavelength bandwidth of said at least one of said plurality of peaks of shaped intensity of said output light spectrum of said CRT.

6. The head-up display system as defined in claim 4 wherein said at least one peak is two peaks of shaped intensity within a wavelength bandwidth, and wherein said contoured spectrum reflector has a reflectance over a bandwidth that is less than 30 nm wide and which includes the frequencies of said two peaks of shaped intensity of said output light spectrum of said CRT.

7. A dielectric combiner for a head-up display system that superimposes visual data produced by a CRT as a output light spectrum that is a shaped intensity portion of the visual spectrum on a background scene illuminated with ambient light across the visual spectrum including:
a transparent substrate having:
  first and second sides; and
a dielectric contoured spectrum reflector on said second side of said substrate having:
  a reflectance spectrum of a limited band of visual frequencies including at least a portion of the output light spectrum of the CRT, whereby most of the visual spectrum passes therethrough.

8. The dielectric combiner as defined in claim 7 having:
a reflectance wavelength band that is less than 35 nm wide and which has at least two areas of frequency where reflectance peaks.

9. The dielectric combiner as defined in claim 7 wherein said contoured spectrum reflector has:

a plurality of first dielectric layers having:
  a first refractive index; and
  thicknesses that are a quarter wavelength of the frequencies in the visual spectrum; and
a plurality of second dielectric layers having:
  a second refractive index lower than said first reflective index interleaved with said first dielectric layers; and
  thicknesses that are a quarter wavelength of the frequencies in the visual spectrum, whereby said dielectric combiner superimposes the light output of said CRT on the background scene by selectively reflecting the light output of said CRT while transmitting the remainder of the frequencies of the visual spectrum therethrough.

10. The dielectric combiner as defined in claim 9 wherein at least some of said layers of said pluralities of first and second dielectric layers have different thicknesses.

11. The dielectric combiner as defined in claim 9 wherein said thicknesses of said pluralities of first and second dielectric layers are chosen and said first and second layers are interleaved so that said dielectric combiner has a reflectance spectrum over a bandwidth that includes the spectral light output of the CRT over a selected spread of elevational viewing angles.

12. The dielectric combiner as defined in claim 9 having a reflectance spectrum that is less than 35 nm wide and which corresponds to two adjacent peaks of spectral light output of a CRT that produces most light output in only portions of the visible spectrum.

13. The dielectric combiner as defined in claim 8 having a reflectance notch over a bandwidth that corresponds to the spectral light output of a CRT that produces most light output in only portions of the visible spectrum.

14. A dielectric combiner for superimposing visual data projected mostly with a light spectrum band that only contains a portion of the visible spectrum on a visual background, most of said visible spectrum of said visual background being transmitted through said dielectric combiner, said dielectric combiner including:
  a substrate that is transparent to the visible spectrum having:
    first and second sides, said substrate being adapted for positioning with said first side toward the visual background; and
  a dielectric reflector on said second side of said substrate having:
    a reflectance that includes the light spectrum band of the visual data.

15. The dielectric combiner as defined in claim 14 wherein said reflectance has a wavelength bandwidth that is less than 30 nm wide.

16. The dielectric combiner as defined in claim 14 wherein said dielectric reflector has:
a plurality of first dielectric layers having:
  at least one refractive index in a first band; and
  thicknesses that approximate a quarter wavelength in the visible spectrum; and
a plurality of second dielectric layers having:
  thicknesses that approximate a quarter wavelength in the visible spectrum; and
  at least one refractive index in a second band different than said first band, said second dielectric layers of said plurality of second dielectric layers being interleaved between said first dielectric layers of said plurality of first dielectric layers, whereby said dielectric combiner superimposes the visual data on the background by selectively reflecting the visual data while transmitting the background reduced by the bandwidth of the visual data therethrough.

17. The dielectric combiner as defined in claim 16 wherein said layers of said pluralities of first and second dielectric layers have thicknesses that are one quarter wavelength of wavelengths in said output light spectrum.

18. The dielectric combiner as defined in claim 14 wherein the visual data has a fixed shaped spectrum, said dielectric combiner having a reflectance spectrum shaped to follow the fixed shaped spectrum of the visual data.

19. A head-up display system that superimposes visual data on a background scene including:

a CRT for producing visual data as a light output, said CRT having:
  an output light spectrum with a bandwidth of shaped intensity so that a major portion of the light output thereof is within a first wavelength band 25 nm wide; and
a dielectric combiner having:
  a transparent substrate; and
  a contoured spectrum reflector on said substrate having a reflectance that reflects said first wavelength band and otherwise transmits visible light, said contoured spectrum reflector including:
    a plurality of first dielectric layers having:
      a first refractive index range; and
      thicknesses that are one quarter the wavelengths of visible light; and
    a plurality of second dielectric layers having:
      a second refractive index range different than said first refractive index range; and
      thicknesses that are one quarter the wavelengths of visible light, wherein said plurality of second dielectric layers are interleaved between said first dielectric layers, said dielectric combiner being positioned and angled with respect to the background scene and said light output of said CRT to superimpose said light output of said CRT in said first wavelength band on the background scene, and said contoured spectrum reflector having said first and second dielectric layers configured to produce a reflectance notch that not more than 35 nm wide, which includes said first wavelength band of said CRT.

20. The head-up display system as defined in claim 19 wherein said first wavelength band of said CRT includes:
  two peaks of light output intensity therewithin, and wherein said contoured spectrum reflector has:
  a reflectance wavelength band that is not more than 30 nm wide.

21. The head-up display system as defined in claim 19 wherein at least some of said layers of said pluralities of first and second dielectric layers have different thicknesses.

* * * * *